(12) United States Patent
Yamada et al.

(10) Patent No.: US 6,690,421 B1
(45) Date of Patent: Feb. 10, 2004

(54) STRUCTURE OF SOLID STATE IMAGE PICKUP DEVICE

(75) Inventors: Tetsuo Yamada, Miyagi (JP); Kazuyuki Masukane, Miyagi (JP)

(73) Assignees: Fuji Photo Film Co., Ltd., Kanagawa (JP); Kabushiki Kaisha Toshiba, Kanagawa-ken (JP)

(*) Notice: Subject to any disclaimer, the term of this patent is extended or adjusted under 35 U.S.C. 154(b) by 0 days.

(21) Appl. No.: 08/960,058

(22) Filed: Oct. 29, 1997

(30) Foreign Application Priority Data

Oct. 30, 1996 (JP) ............................................. 8-288857
Oct. 30, 1996 (JP) ............................................. 8-288858

(51) Int. Cl.[7] .......................... H04N 3/14; H04N 5/335
(52) U.S. Cl. ...................................... 348/272; 348/275
(58) Field of Search .................................. 348/316, 317, 348/318, 319, 320, 322, 311, 294, 272, 273, 207, 275, 315, 207.99; 250/208.1; 257/240, 241, 231, 232, 233, 234

(56) References Cited

U.S. PATENT DOCUMENTS

| | | | | |
|---|---|---|---|---|
| 4,336,556 A | * | 6/1982 | Sekine et al. | 348/319 |
| 4,438,457 A | * | 3/1984 | Tandon et al. | 348/316 |
| 4,447,735 A | * | 5/1984 | Horii | 348/319 |
| 4,455,575 A | * | 6/1984 | Murakoshi | 348/322 |
| 4,500,915 A | * | 2/1985 | Koike et al. | 348/319 |
| 4,514,766 A | * | 4/1985 | Koike et al. | 348/322 |
| 4,553,159 A | * | 11/1985 | Moraillon | 348/316 |
| 4,570,178 A | * | 2/1986 | Morimura et al. | 348/275 |
| 4,583,003 A | * | 4/1986 | Kimata | 348/322 |
| 4,602,289 A | * | 7/1986 | Sekine | 348/315 |
| 4,761,682 A | * | 8/1988 | Asaida | 348/265 |
| 4,928,158 A | * | 5/1990 | Kimata | 348/316 |
| 5,194,724 A | * | 3/1993 | Sekine | 250/208.1 |
| 5,249,041 A | * | 9/1993 | Shiraishi | 348/231 |
| 5,376,967 A | | 12/1994 | Sakota et al. | 348/311 |
| 5,452,129 A | * | 9/1995 | Shiraishi | 348/290 |
| 5,528,291 A | | 6/1996 | Oda | 348/220 |
| 5,576,562 A | * | 11/1996 | Konuma | 257/232 |
| 5,602,391 A | * | 2/1997 | Pines et al. | 250/208.1 |
| 5,608,455 A | | 3/1997 | Oda | 348/245 |
| 5,726,709 A | * | 3/1998 | Kinoshita et al. | 248/264 |
| 5,793,071 A | * | 8/1998 | Sekine | 257/240 |
| 5,990,946 A | * | 11/1999 | Sakurai et al. | 348/273 |

FOREIGN PATENT DOCUMENTS

JP          5-219445          8/1993          H04N/5/335

* cited by examiner

*Primary Examiner*—Aung Moe
(74) *Attorney, Agent, or Firm*—Sughrue Mion, PLLC

(57) ABSTRACT

A solid state image pickup device in which a plurality of photoelectric conversion element pairs are disposed in a row direction and a column direction, each pair constituting one unit including two adjacent photoelectric conversion elements disposed in the column direction, wherein a pitch of pairs in the row direction is generally equal to a pitch of pairs in the column direction.

10 Claims, 10 Drawing Sheets

STRUCTURE OF SOLID STATE IMAGE PICKUP DEVICE

This application is based on Japanese patent applications No. 8-288857 filed on Oct. 30, 1996, and No. 8-288858 filed on Oct. 30, 1996, the entire contents of which are incorporated herein by reference.

BACKGROUND OF THE INVENTION a) Field of the Invention

The present invention relates to a solid state image pickup device, and more particularly to the structure of a solid state image pickup device suitable for realizing high resolution and capable of reading pixel signals of one frame at the same time.

b) Description of the Related Art

Charge transfer type solid state image pickup devices or so-called charge coupled devices (CCD) have been developed to mount them on cameras of televisions, video tape recorders and the like of NTSC standards. In NTSC standards, an image of one frame is divided into signals of two fields through interlace scanning, and signal charges of photosensors of the first or second field are read at the same time. In other words, two photosensors are generally provided with one transfer stage.

Non-interlace scanning is necessary, however, for electronic still cameras or televisions of new standards. In this case, one photosensor is provided with one transfer stage (generally four electrodes). As a method of configuring this structure, a solid state image pickup device having the structure shown in FIG. 9 has been proposed.

FIG. 10 is a schematic plan view showing at a larger scale a partial area of a solid image pickup device of the non-interlace type that signals of all pixels of one frame can be read at the same time. In FIG. 10, reference numeral 1 represents a photoelectric conversion element (hereinafter called a photosensor) such as a photodiode. Photosensors 1 generally indicated at 2a and disposed in the vertical direction (column direction) as viewed in FIG. 10 constitute a first photosensor column. Photosensors 1 generally indicated at 2b and disposed in the vertical or column direction constitute a second photosensor column. The first and second photosensor columns 2a and 2b are alternately juxtaposed in the right/left direction (row direction) as viewed in FIG. 10. Photosensors 1 generally indicated at 3 and disposed in the row direction constitute a first photosensor row. Photosensors 1 generally indicated at 4 and disposed in the row direction constitute a second photosensor row. The first and second photosensor rows 3 and 4 are alternately disposed side by side in the column direction.

In FIG. 10, reference numerals 5 and 6 represent first and second column direction charge transfer devices for reading signal charges of the first and second photosensor columns 2a and 2b and transferring the read charges in the column direction. In other words, the first and second column direction charge transfer devices are disposed on both sides of each photosensor column to receive signal charges from every second photosensors and transfer them in the column direction.

Also in FIG. 10, reference numeral 7 represents a controller (gate) for controlling to select signal charges transferred by either the first or second column direction charge transfer device 5, 6 and transfer the selected signal charges to a row direction charge transfer device 8 which transfers the received signal charges in the row direction. Reference numeral 9 represents an output circuit (amplifier) for generating voltages corresponding to the amounts of signal charges transferred from the row direction charge transfer device 8 and outputting the generated voltages to an external circuit (not shown). The photosensors 1, column direction charge transfer devices 5 and 6, controllers 7, row direction charge transfer device 8 and output circuit 9 are all integrally formed on a single semiconductor substrate (not shown).

In the above-described solid state image pickup device shown in FIG. 10, the first and second column direction charge transfer devices 5 and 6 are disposed on both sides of each photosensor column 2a, 2b and provide one transfer stage 150 per one photosensor 1. Each transfer stage 150 includes charge signal storage regions (packets).

Solid state image pickup devices used with electronic still cameras or television cameras of new standards are desired to have the same pitch of photosensors both in the row and column directions. If the pitch of photosensors is same in both the row and column directions, photosensors can be disposed in a square lattice shape. This layout is advantageous in that the pitch of pixels of a display device has integrity with that of photosensors of the solid state image pickup device and in that signal processing becomes easy.

However, since two column direction charge transfer devices 5 and 6 are disposed between the first and second photosensor columns 2a and 2b, the pitch Wh of photosensors disposed in the row direction is longer than that Wv of photosensors disposed in the column direction, and it is difficult to shorten the pitch in the row direction. In order to make both the pitches equal, the pitch in the column direction is required to be broadened to the pitch in the row direction. This approach, however, results in difficulty in high integration of solid state image pickup devices.

Further, in the structure shown in FIG. 10, the direction of reading signal charges of photosensors in each row by the first column charge transfer device 5 is opposite to that by the second column charge transfer device 6. If the relative position of the photosensor columns 2a and 2b and the first and second column direction charge transfer devices 5 and 6 is displaced during the manufacture processes of solid state image pickup devices, the characteristics of reading pixel signals change between adjacent photosensors disposed in the row direction. For example, if the photosensors 1 are displaced to the right relative to the column direction charge transfer devices 5 and 6, the relative position of the photosensors 1 constituting the first photosensor row 3 and the first column transfer device 5 becomes short whereas the relative position of the photosensors 1 constituting the second photosensor row 4 and the second column transfer device 6 becomes long. Therefore, signal charges of the first photosensor row 3 are easy to read, whereas signal charges of the second photosensor row 4 are difficult to read.

Still further, since the amounts of false signals called smear become different between the first and second column direction charge transfer devices 5 and 6, a fatal fixed pattern in a vertical strip shape appears as noises. Smear is generated by the leakage of a fraction of light incident upon the photosensor 1 to the column direction charge transfer devices 5 and 6.

In the structure of such a conventional solid state image pickup device, the pitch in the row direction from the first column direction charge transfer device 5 to the second transfer device 6 interposing an element separation layer 10 therebetween is different from the pitch from the second transfer device 6 to the first transfer device 5 interposing each photosensor 1 therebetween. For the coupling of charge signals between the first and second column direction charge transfer devices 5 and 6 to the row direction charge transfer device 8, it becomes necessary to make the pitch of all the first and second column direction charge transfer devices 5 and 6 equal to that of all transfer stages of the row direction charger transfer device 8. To this end, the controller 7 is provided between the column direction charge transfer device 5, 6 and the row direction charge transfer device 8, so as to substantially combine two adjacent first and second column direction charge transfer devices 5 and 6 and couple a combined set of two transfer devices 5 and 6 to the row direction charge transfer device 8. However, in this case, in transferring all signal charges of one row in the column direction, two complicated transfer operations are required. Namely, each controller 7 performs a first transfer operation for transferring signal charges from the first column direction charge transfer device 5, and then a second transfer operation for transferring signal charges from the second column direction charge transfer device 6.

SUMMARY OF THE INVENTION

It is an object of the present invention to provide a solid state image pickup device with a novel structure capable of improving a resolution and realizing uniform characteristics of photosensors in each row even if conventional manufacture processes are used.

According to one aspect of the present invention, there is provided a solid state image pickup device comprising:

a plurality of photoelectric conversion element pairs disposed in a row direction and a column direction, each pair constituting one unit including two adjacent photoelectric conversion elements disposed in the column direction, wherein a pitch of pairs in the row direction is generally equal to a pitch of pairs in the column direction.

According to another aspect of the present invention, there is provided a solid state image pickup device comprising: a plurality of photoelectric conversion elements disposed in a row direction and a column direction at a predetermined pitch; first and second column direction charge transfer devices disposed on both sides of each photoelectric conversion element column including a plurality of photoelectric conversion elements disposed in the column direction, the first and second column direction charge transfer devices transferring signal charges output from the photoelectric conversion elements in the column direction; a row direction charge transfer device for transferring signal charges in the row direction; a channel position changing unit for transferring signal charges from the first and second column direction charge transfer devices to the row direction charge transfer device, the channel position changing unit adjusting positions of all signal charges from the first and second column direction charge transfer devices to be at a constant interval on the row direction charge transfer device; and an output circuit for converting signal charges from the row direction charge transfer device into voltage signals and outputting the voltage signals.

A solid state image pickup device having uniform characteristics of photosensors in each row, of the type that signal charges of all pixels in one frame are read at the same time, can be realized without forming photoelectrically inactive areas, by using conventional manufacture processes of a solid image pickup device with two-layer stacked electrodes with partially overlapped regions. Furthermore, the pitch of photosensor pairs in the column direction is made generally equal to that of photosensors in the row direction. Accordingly, the resolution of the solid state image pickup device can be improved without broadening the pitch of photosensors.

DETAILED DESCRIPTION OF THE PREFERRED EMBODIMENTS

Figure 1:
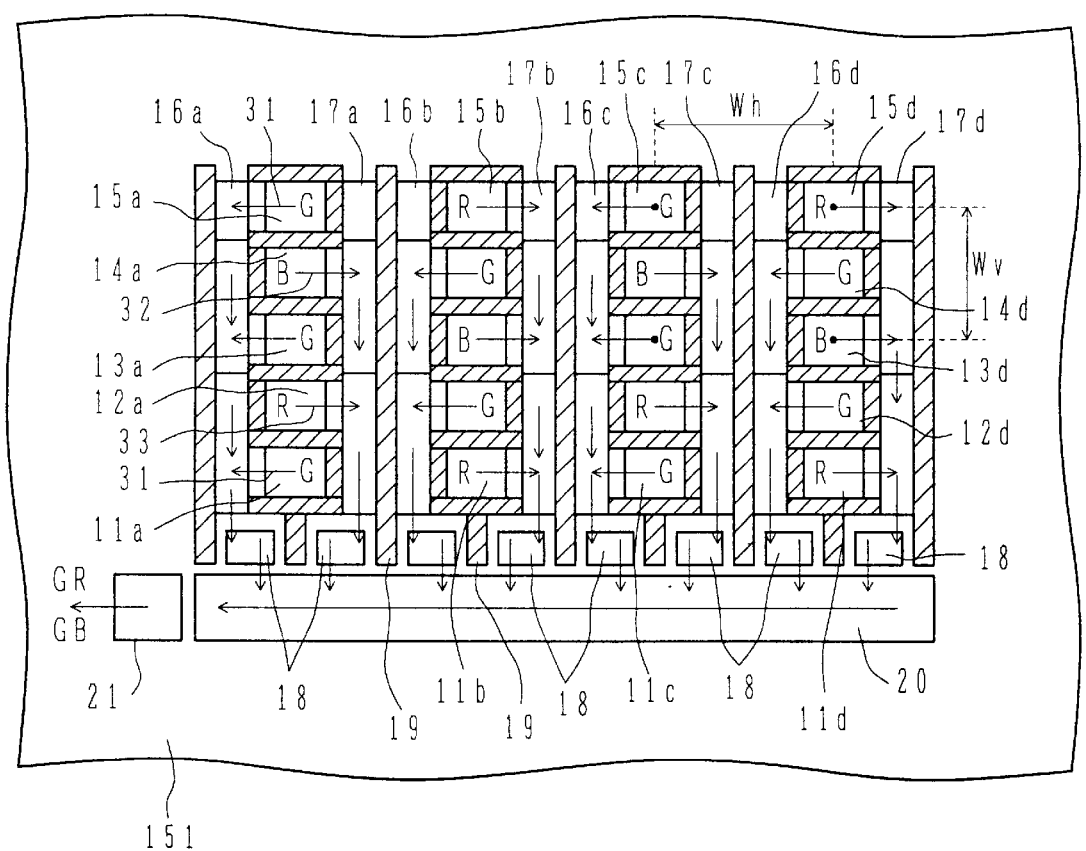
FIG. 1 is a schematic plan view showing at a larger scale a partial area of a solid image pickup device according to a first embodiment of the invention.

FIG. 1 is a schematic plan view showing at a larger scale a partial area of a solid image pickup device according to the first embodiment of the invention. In FIG. 1, reference symbols 11a to 11d represent photosensors constituting a first photosensor row, reference symbols 12a to 12d represent photosensors constituting a second photosensor row, reference symbols 13a to 13d represent photosensors constituting a third photosensor row, reference symbols 14a to 14d represent photosensors constituting a fourth photosensor row, and reference symbols 15a to 15d represent photosensors constituting a fifth photosensor row. Photosensors are photoelectric conversion elements such as photodiodes. First column direction charge transfer devices 16a, 16b, 16c and 16d are disposed on the left side of respective photosensor columns, and second column direction charge transfer devices 17a, 17b, 17c and 17d are disposed on the right side of respective photosensor columns. In the following, the first column direction charge transfer devices 16a to 16d are collectively called a first column direction charge transfer device, and the second column direction charge transfer devices 17a to 17d are collectively called a second column direction charge transfer device.

Reference numeral 18 represents channel (transfer stage) position changing units for disposing channels of all column direction charge transfer devices generally at a constant pitch in the row direction. Reference numeral 19 represents element isolation layers for electrically isolating each column direction charge transfer device and each photosensor, and for electrically isolating each column direction charge transfer device from partial areas of photosensors. Reference numeral 20 represents a row direction charge transfer device for receiving signal charges of one row transferred from the first and second column direction charge transfer devices via the channel position changing units 18 and transferring them to an output circuit 21 which generates voltages corresponding to the amounts of signal charges transferred from the row direction charge transfer device 20. The photosensors 11 to 15, column direction charge transfer devices 16 and 17, row direction charge transfer device 20 and output circuit 21 are all fabricated on a single semiconductor device 151.

In this embodiment, when considering each pair of photosensors disposed in the column direction as one unit, the pitch Wv between adjacent units: in the column direction is set generally equal to the pitch Wh between adjacent photosensors in the row direction. Generally equal means that a difference between pitches is 20% or less of an average value of all pitches.

In this embodiment, further, the channel position changing unit 18 is disposed between each column direction charge transfer device and the row direction charge transfer device. Therefore, the pitch between last transfer stages of the column direction charge transfer devices is substantially made to have integrity with the pitch between transfer stages of the row direction charge transfer device 20. Each channel position changing unit 18 is provided at each column direction charge transfer device. With this structure, signal charges can be transferred at the same time from the column direction charge transfer devices to the row direction charge transfer device 20. The positions in the row direction of the channel position changing units 18 are set so that the units 18 are disposed generally at an equal interval along the row direction charge transfer device in correspondence with the positions of the column direction charge transfer devices. This interval is preferably set so that a difference of distances between adjacent units 18 is 20% or less of an average value of all distances.

Figure 10:
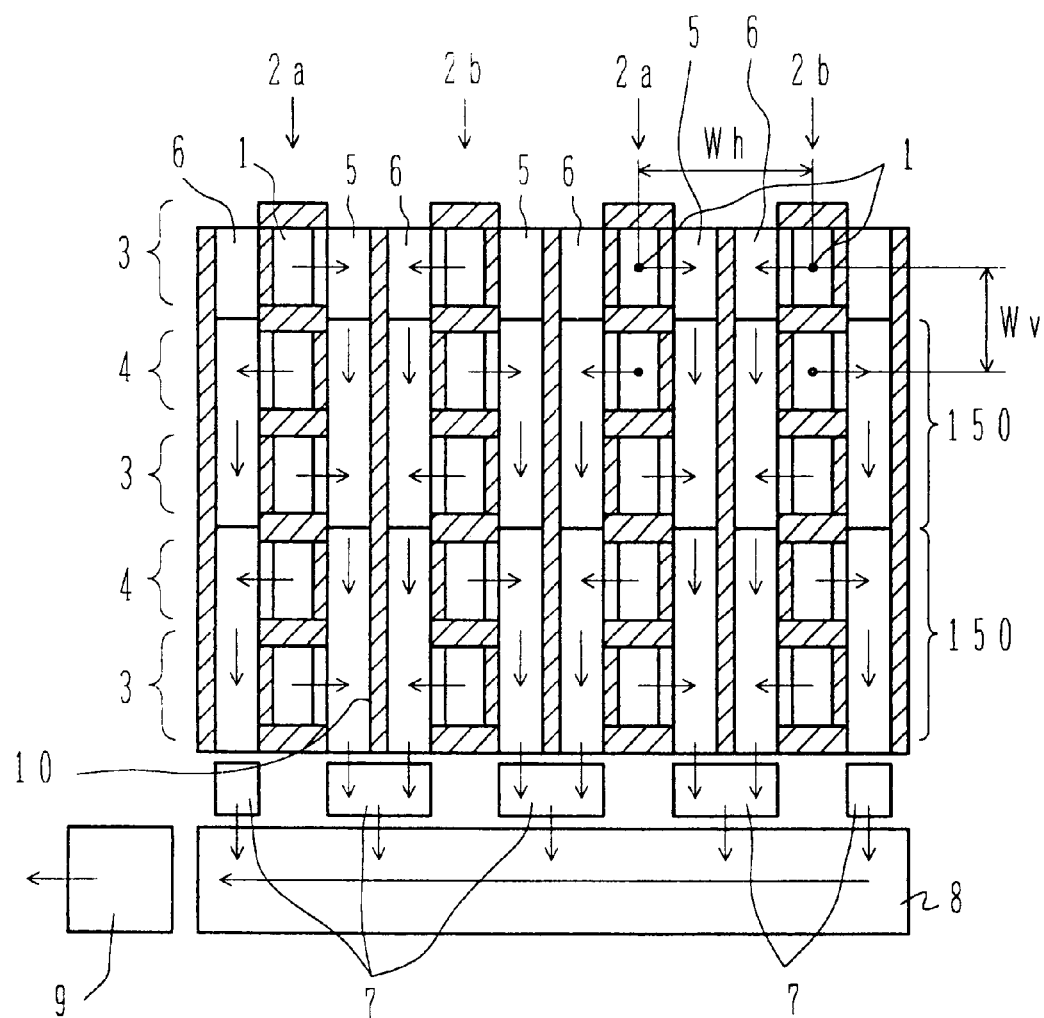
FIG. 10 is a schematic plan view showing at a larger scale a partial area of a solid image pickup device according to conventional techniques.

In the conventional solid state image pickup device shown in FIG. 10, the controller 7 substantially combines two adjacent first and second column direction charge transfer devices 5 and 6 and couples a combined set of two transfer devices 5 and 6 to the row direction charge transfer device 8. The controller 7 selects charge signals either from the first or second column direction charge transfer device 5, 6 and transfers the selected charge signals to the row direction charge transfer device 8. Therefore, in transferring all signal charges of one row in the column direction, two-complicated transfer operations are required.

In the solid state image pickup device of this embodiment shown in FIG. 1, however, the channel position changing units 18 can transfer signal charges from all the first and second column direction charge transfer devices 16 and 17 at the same timing to the row direction charge transfer device 20. Only one transfer operation is therefore necessary for transferring all signal charges of one row in the column direction.

In this embodiment shown in FIG. 1, color filters indicated at G (green), B (blue) and R (red) are formed on the light receiving area of each photosensor. In this embodiment, signal charges (G signal charges) of the photosensors with G filters are transferred by the first column direction charge transfer devices 16a to 16d, and signal charges (B and R signal charges) of the photosensors with B and R filters are transferred by the second column direction charge transfer devices 17a to 17d. Signal charges of the G, R and B signals are read in the same direction for each color, and the path of signal charges has the same structure for each color. Therefore, the electric characteristics of each color signal are uniform over the whole image pickup area.

With this structure, even if a relative position of the photosensors, column direction charge transfer devices, light shielding openings and the like is displaced by variations in manufacture processes, this relative position does not change in each row. Therefore, the electric and optical characteristics of each row are always uniform.

In general, the luminance signal which determines an image resolution is generated through weighted addition of mainly the G signal and supplementarily the R and B signals. In the embodiment, as apparent from the structure shown in FIG. 1, the G signal is provided at all image sampling units. Each image sampling unit is constituted of a pair of adjacent two upper and lower photosensors disposed in the column direction, and forms a sampling point in a square lattice shape. A pair of G and R signals and a pair of G and B signals are alternately disposed. A pair of G and R signals or a pair of G and B signals is obtained from each sampling point corresponding to the sampling unit. It is easy to obtain a resolution corresponding to the number of sampling units.

With the conventional techniques shown in FIG. 10, each photosensor corresponds to one image sampling unit, and it is therefore impossible to realize the layout of color filters allowing the G signal to be obtained from all sampling points. The number of G areas is a half of that of sampling units so that the resolution is a half of this embodiment.

Also in the embodiment of the invention, the direction of reading signal charges from photosensors to the column direction charge transfer device is the same for each color. Specifically, all G signals are read to the column direction charge transfer devices positioned on the right side, while all R and B signals are read to the column direction charge transfer devices positioned on the left side. A change in the relative position, for example, of photosensors and column direction charge transfer devices caused by variations in manufacture processes becomes uniform for each color. Therefore, a change in the characteristics caused by structural variations becomes uniform for each color, and so a variation in fixed pattern noises of photosensors does not occur substantially.

The characteristics of two photosensors constituting one sampling unit may change, however, with a shift of a relative position of the two photosensors and column direction charge transfer device. In this case, however, this relative position shift does not pose any practical problem because the color filter of one photosensor is always G and the color filter of the other photosensor is R or B according to the layout of color filters shown in FIG. 1. Compensation for this relative position shift can be easily performed during signal processing wherein the G, R and B signals output from the image pickup device are separated into the G and R signals or the G and B signals and amplified thereafter.

Techniques of forming photosensors at high density on a semiconductor chip have been developed heretofore. Recently, cameras which take an image not on a film but on a solid state image pickup device have been used. The solid state pickup device used for such cameras may have a photosensitive area same as that of a 135-type film, which area is considerably large as compared with conventional solid state image pickup devices. Since the size of a semiconductor chip used for such solid state image pickup devices may be large, photosensors can be formed on such a semiconductor chip at low density in order to realize the resolution of a conventional device (form the same number of photosensors as the conventional device). Therefore, even if one of the pitches Wh and Wv is made larger than the conventional device in order to make both the pitches Wh and Wv equal to each other, the resolution is not lowered. Further, even if the channel position changing device 18 is provided at each column direction charge transfer device or the number of transfer stages of the row direction charge transfer device 10 is increased, high integration techniques are not necessary because of a large size of the semiconductor chip. Such solid state image pickup devices can be manufactured by conventional processes.

For example, a semiconductor chip used for such cameras is 35×50 mm and the number of photosensors formed on this chip is one billion. It is preferable to form three billions of photosensors on a semiconductor chip having an area of 35×50 mm.

Figure 2:
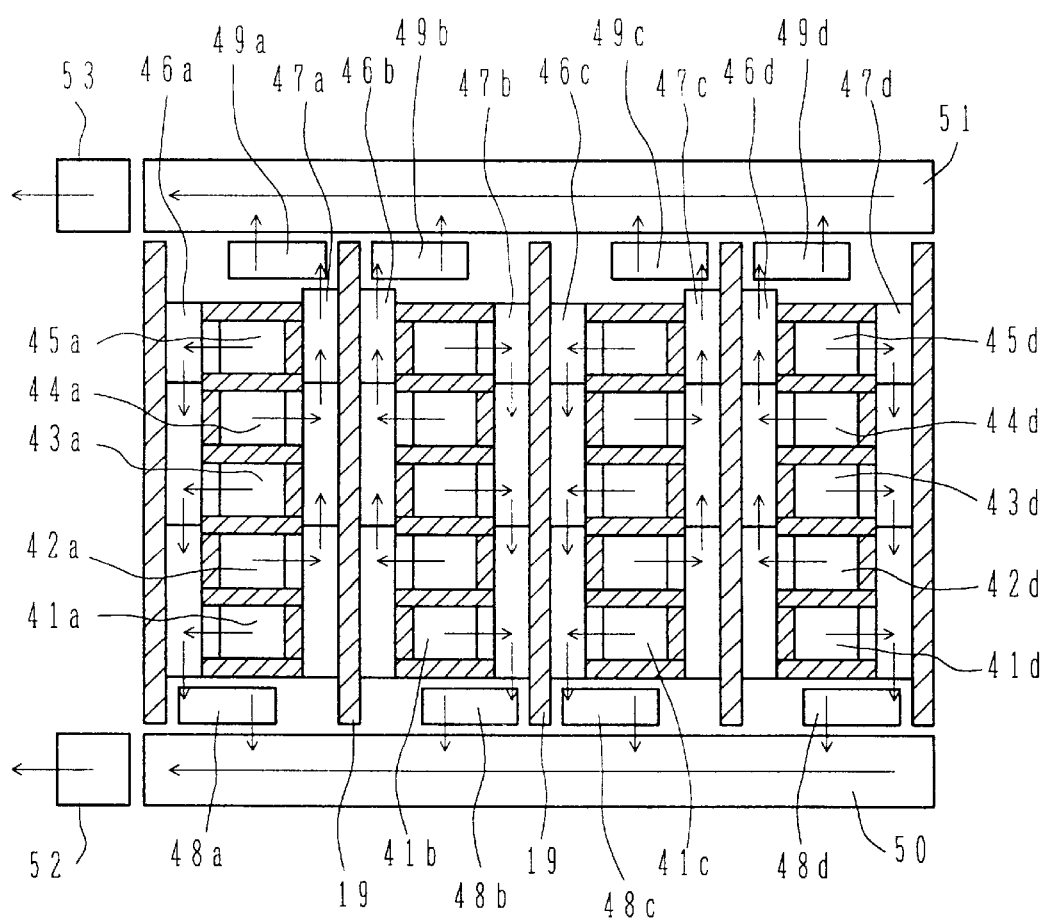
FIG. 2 is a schematic plan view showing at a larger scale a partial area of a solid image pickup device according to a second embodiment of the invention.

FIG. 2 is a schematic plan view showing at a larger scale a partial area of a solid image pickup device according to the second embodiment of the invention. In FIG. 2, reference symbols 41a to 41d represent photosensors constituting a first photosensor row, reference symbols 42a to 42d represent photosensors constituting a second photosensor row, reference symbols 43a to 43d represent photosensors constituting a third photosensor row, reference symbols 44a to 44d represent photosensors constituting a fourth photosensor row, and reference symbols 45a to 45d represent photosensors constituting a fifth photosensor row. First column direction charge transfer devices 46a, 46b, 46c and 46d are disposed on the left side of respective photosensor columns, and second column direction charge transfer devices 47a, 47b, 47c and 47d are disposed on the right side of respective photosensor columns. A row direction charge transfer device 50 is connected to the last transfer stages of the column direction charge transfer devices, with channel position changing units 48a to 48d being interposed therebetween, and a row direction charge transfer device 51 is connected to the first transfer stages of the column direction charge transfer devices, with channel position changing units 49a to 49d being interposed therebetween.

As seen from FIG. 2, the column direction charge transfer devices 46a, 47b, 46c and 47d transfer signal charges downward, and the column direction charge transfer devices 47a, 46b, 47c and 46d transfer signal charges upward. The signal charges transferred downward are transferred via the lower channel position changing units 48a to 48d to a lower row direction charge transfer device 50, and the signal charges transferred upward are transferred via the upper channel position changing units 49a to 49d to an upper row direction charge transfer device 51. The signal charges transferred by the upper and lower row direction signal charge transfer devices 51 and 50 are then output separately from upper and lower output circuits 53 and 52.

In this embodiment, since signal charges are divided into upper and lower signal charges, the number of signal charge blocks transferred by each row direction charge transfer device is halved so that the number of transfer stages of each row direction charge transfer device can be halved. With the reduction of the number of transfer stages by a half, not only integration of row direction charge transfer devices can be alleviated by a half but also the number of charge transfer times can be halved and the total transfer loss can be considerably reduced.

In this embodiment, a pair of two adjacent column direction charge transfer devices interposing the element separation layer 19 therebetween operates to transfer signal charges either upward or downward. This is because the transfer electrodes of the two adjacent column direction charge transfer devices can be easily patterned and formed traversing the element separation layer 19, and the pattern itself does not become complicated.

Figure 3:
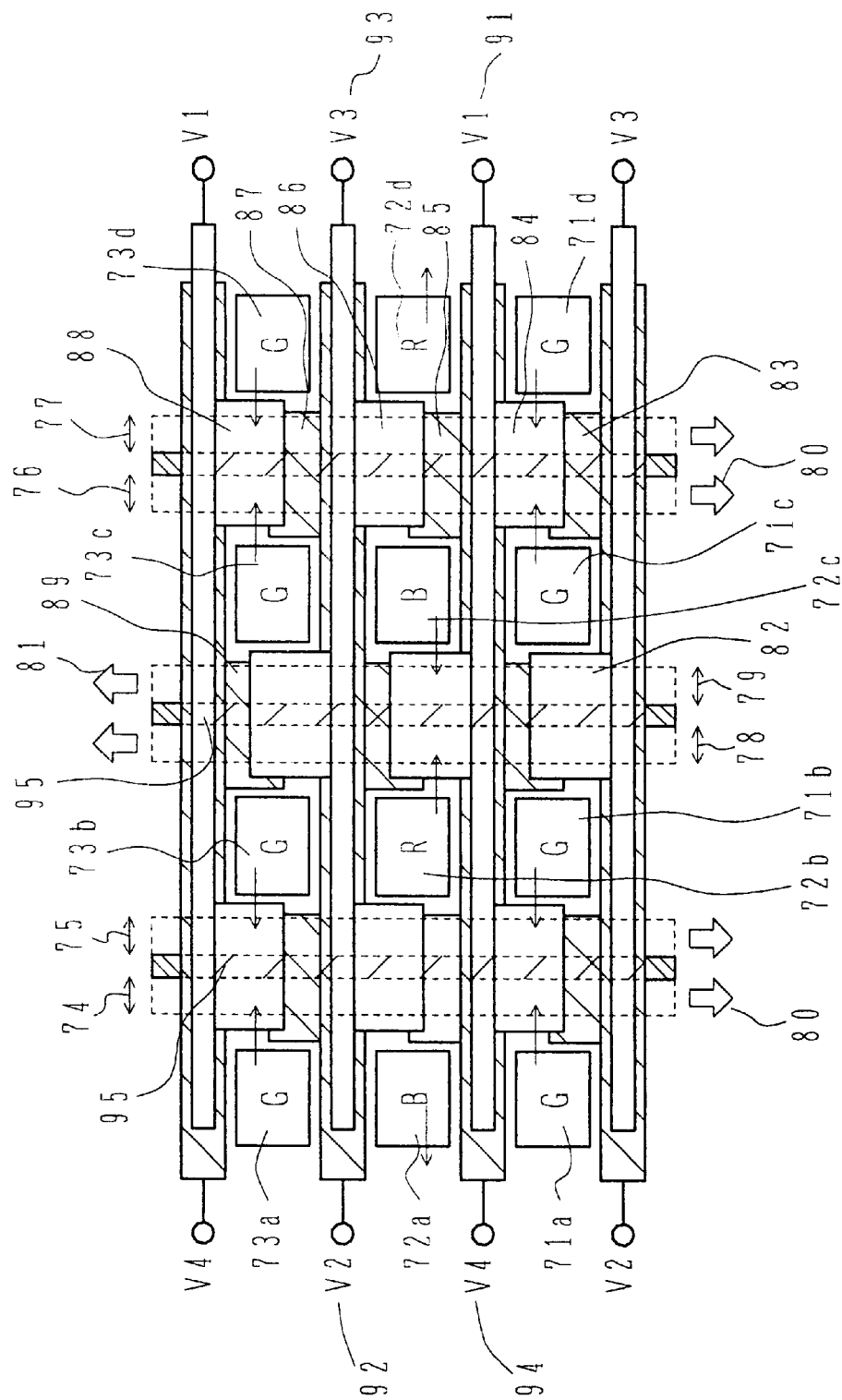
FIG. 3 is an enlarged view showing the electrode structure of a column direction charge transfer device covering three rows of the solid state image pickup device of the second embodiment, with color filters being disposed on photosensors.

FIG. 3 is a schematic plan view at a larger scale showing an electrode pattern of the column direction charge transfer devices corresponding to three rows of the solid state image pickup device such as shown in FIG. 2. G signals from photosensors 71a and 73a are read by a column direction charge transfer device 74, and G signals from photosensors 71b and 73b are read by a column direction charge transfer device 75.

Similarly, G signals from photosensors 71c and 73c are read by a column direction charge transfer device 76, and G signals from photosensors 71d and 73d are read by a column direction charge transfer device 77. R and B signals from photosensors 72b and 72c are read by column direction charge transfer devices 78 and 79, respectively.

The column direction charge transfer device has a known two-layer stacked electrode structure with partially overlapped areas. Regarding the general knowledge of this two-layer stacked electrode structure, reference may be made to JPA-5-219445 which is incorporated herein by reference. Reference numerals 83, 85 and 87 represent first-layer electrodes (indicated by hatching), and reference numerals 84, 86 and 88 represent second-layer electrodes. The positions of the first and second layers on adjacent two columns interposing a photodiode column are reversed.

Known four-phase transfer pulses $V_1$, $V_2$, $V_3$ and $V_4$ are applied to the transfer electrodes via terminals 91, 92, 93 and 94. Regarding the general knowledge of four-phase drive, reference may be made to U.S. Pat. No. 5,376,967 issued on Dec. 27, 1994 which is incorporated herein by reference. The electrodes of each of the column direction charge transfer devices 74 and 75, 76 and 77 are applied with $V_1$, $V_2$, $V_3$, and $V_4$ in the downward order as viewed in FIG. 3, whereas the electrodes of each of the column direction charge transfer devices 78 and 79 are applied with $V_4$, $V_3$, $V_2$, and $V_1$ in the upward order. In this manner, the column direction charge transfer devices 74 and 75, 76 and 77 transfer signal charges downward, whereas the column direction charge transfer devices 78 and 79 transfer signal charges upward. In this case, as seen from FIG. 3, it is advantageous from the viewpoint of pattern layout or high integration to integrally form electrodes of each pair of the column direction charge transfer devices 74 and 75, 76 and 77, and 78 and 79. Regarding the general knowledge of solid state image pickup devices, reference may be made to U.S. Pat. No. 5,528,291 issued on Jun. 18, 1996, or U.S. Pat. No. 5,608,455 issued on Mar. 4, 1997, which are incorporated herein by reference.

Figure 4:
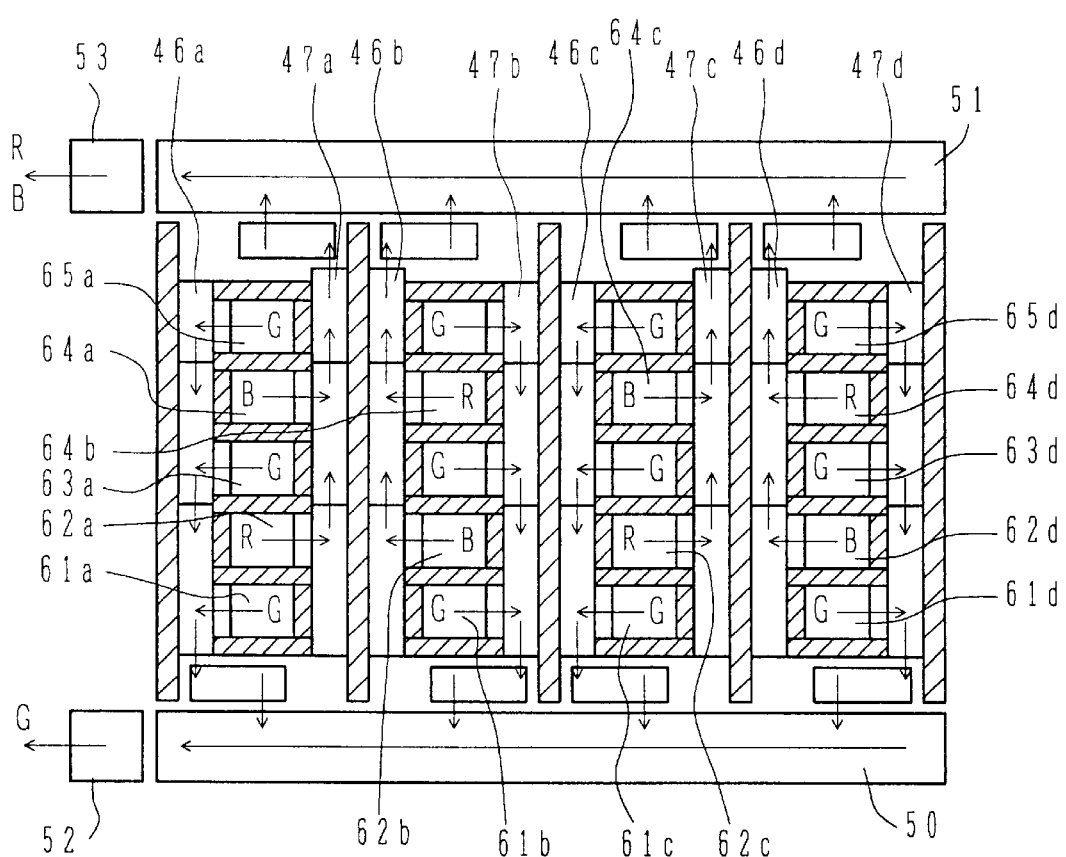
FIG. 4 shows the layout of color filters disposed on the solid state image pickup device of the second embodiment.

FIG. 4 shows a layout of a solid state image pickup device such as shown in FIG. 2 (FIG. 3) applied to a single-plate color image pickup device. A single-plate color image pickup device is a solid state image pickup device with three-color filters disposed on a single semiconductor substrate. G filters are formed over photosensors 61a to 61d constituting a first photosensor row, and R and B filters are formed alternately over photosensors 62a to 62d constituting a second photosensor row. The first and second photosensor rows are disposed alternately. The order of R and B filters are reversed, however, in a second row of photosensors 62a to 62d and a fourth row of photosensors 64a to 64d. In FIG. 4, G signal charges from photosensors 61a, 61b and so on are read by column direction charge transfer devices 46a, 47b, 46c and 47d and transferred to a lower row direction charge transfer device 50. R and B signal charges from photosensors 62a, 63b and so on are read by column direction charge transfer devices 47a and 46b and transferred to an upper row direction charge transfer device 51. G signal charges are thereafter output from an output circuit 52, and R and B signal charges are output from an output circuit 53. Since G, R and B signal charges are output in parallel via separate channels, signal processing to follow becomes easy and a data rate of one channel can be increased by substantially a twofold.

Figure 5:
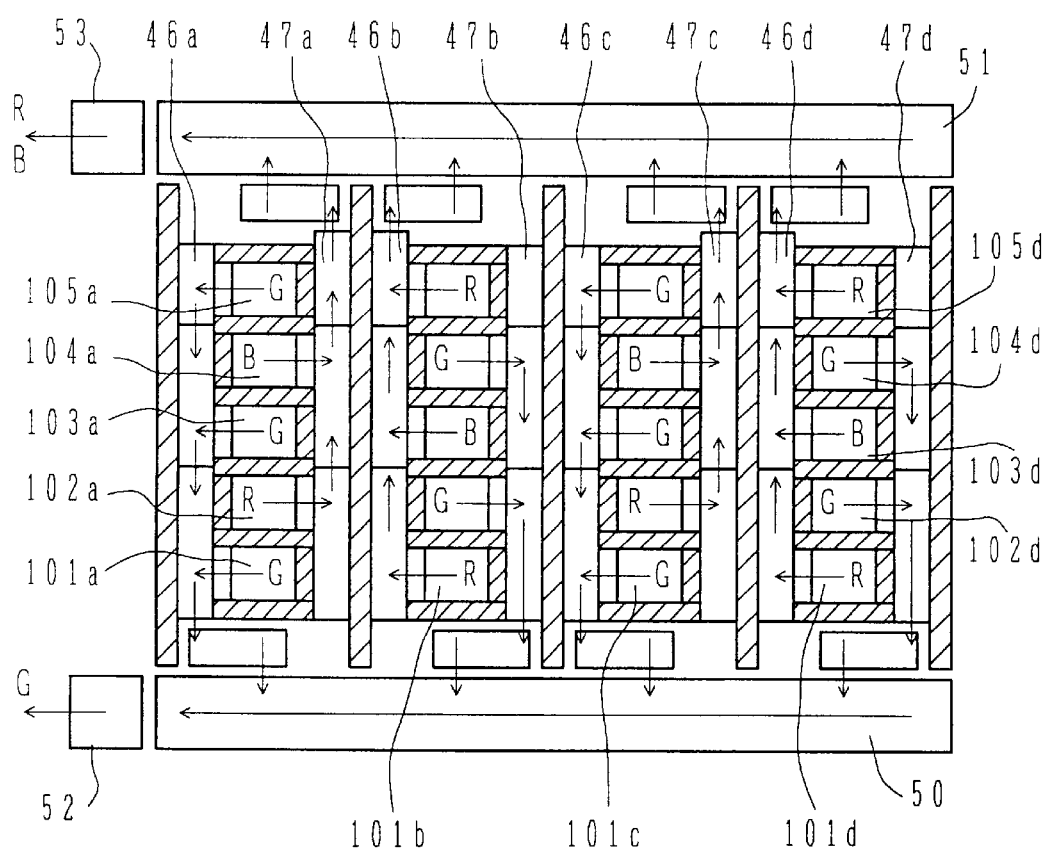
FIG. 5 is a schematic plan view showing at a larger scale a partial area of a solid image pickup device according to a third embodiment of the invention.

FIG. 5 is a schematic plan view showing at a larger scale a partial area of a solid image pickup device according to the third embodiment of the invention. In FIG. 5, reference symbols 101a to 101d represent photosensors constituting a first photosensor row, reference symbols 102a to 102d represent photosensors constituting a second photosensor row, reference symbols 103a to 103d represent photosensors constituting a third photosensor row, reference symbols 104a to 104d represent photosensors constituting a fourth photosensor row, and reference symbols 105a to 105d represent photosensors constituting a fifth photosensor row. First column direction charge transfer devices 46a, 46b, 46c and 46d are disposed on the left side of respective photosensor columns, and second column direction charge transfer devices 47a, 47b, 47c and 47d are disposed on the right side of respective photosensor columns. Elements represented by reference numerals identical to those used in the other drawings indicate like parts.

The characteristic features of the embodiment structure shown in FIG. 5 are as follows. The direction of reading signal charges in one row is same for all photosensors. Color filters are disposed so that G signal charges are transferred either upward or downward, whereas R and B signals are transferred in the direction opposite to the G signal charges. G and R filters are alternately disposed in each of first and second photosensor rows respectively constituted of photosensors 101a to 101d and photosensors 102a to 102d. In the first and second photosensor rows, G and R filters are formed over two adjacent photosensors in the column direction and G and R signals are read by corresponding column direction charge transfer devices in opposite directions. G and B filters are alternately disposed in each of third and fourth photosensor rows respectively constituted of photosensors 103a to 103d and photosensors 104a to 104d. In the third and fourth second photosensor rows, G and B filters are formed over two adjacent photosensors in the column direction and G and B signals are read by corresponding column direction charge transfer devices in opposite directions. Column direction charge transfer devices 46a, 47b, 46c and 47d read G signal charges and transfer them downward, whereas column direction charge transfer devices 47a, 46b, 47c and 46d read R and B signals and transfer them upward. Thereafter, signal charges are transferred to row column charge transfer devices as described above, G signal charges are output from an output circuit 52 and R and B signal charges are output from an output circuit 53.

Figure 6:
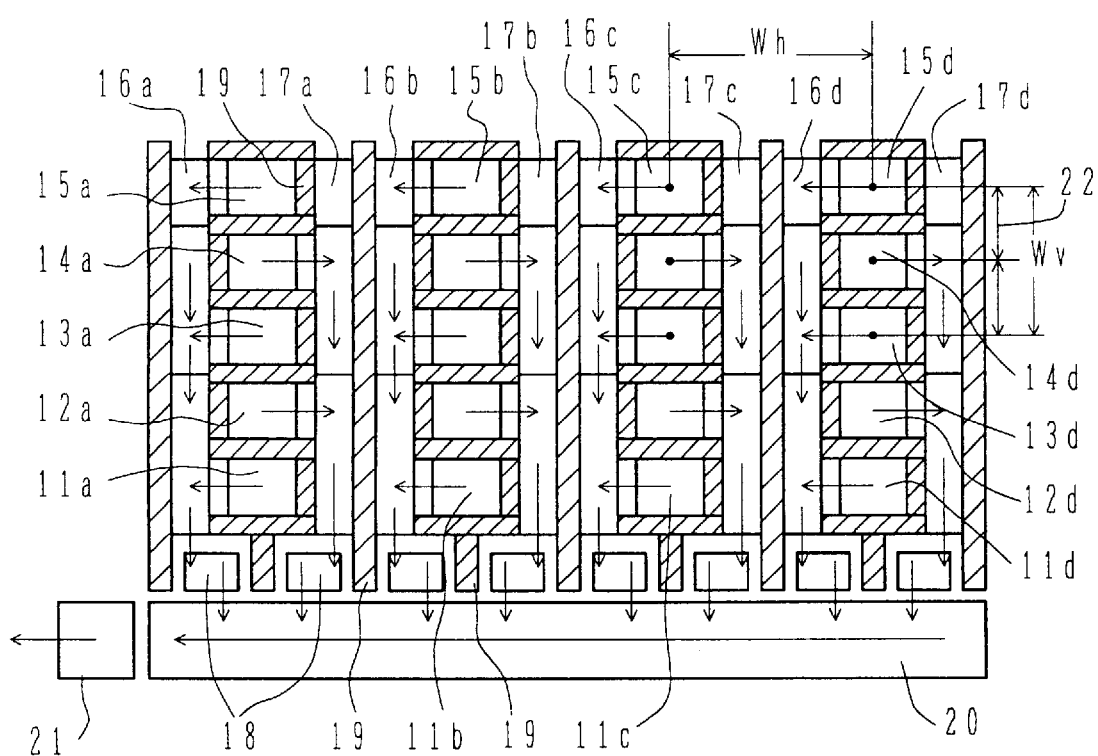
FIG. 6 is a schematic plan view showing at a larger scale a partial area of a solid image pickup device according to a fourth embodiment of the invention.

FIG. 6 is a schematic plan view showing at a larger scale a partial area of a solid image pickup device according to the fourth embodiment of the invention. In this embodiment, although the direction of reading signal charges from photosensors is the same as the third embodiment (FIG. 5), only a single row direction charge transfer device is used. In FIG. 6, reference symbols 11a to 11d represent photosensors constituting a first photosensor row, reference symbols 12a to 12d represent photosensors constituting a second photosensor row, reference symbols 13a to 13d represent photosensors constituting a third photosensor row, reference symbols 14a to 14d represent photosensors constituting a fourth photosensor row, and reference symbols 15a to 15d represent photosensors constituting a fifth photosensor row. First column direction charge transfer devices 16a, 16b, 16c and 16d are disposed on the left side of respective photosensor columns, and second column direction charge transfer devices 17a, 17b, 17c and 17d are disposed on the right side of respective photosensor columns. Reference numeral 18 represents channel position changing units for disposing channels of all column direction charge transfer devices generally at a constant pitch in the row direction. Reference numeral 19 represents element isolation layers for electrically isolating each column direction charge transfer device and each photosensor, and for electrically isolating each column direction charge transfer device from partial areas of photosensors. Reference numeral 20 represents a row direction charge transfer device for receiving signal charges of one row transferred from the first and second column direction charge transfer devices via the channel position changing units 18 and transferring them to an output circuit 21 which generates voltages corresponding to the amounts of signal charges transferred from the row direction charge transfer device 20.

The channel position changing units 18 are disposed at a constant pitch in the row direction, to receive signal charges from each column direction charge transfer device at constant pitch positions in the row direction and to supply the received signal charges to the row direction charge transfer device 20. The pitch between column direction charge transfer devices 16 and 17 is not uniform in the row direction. However, the channel position changing units 18 received signal charges from the column direction charge transfer devices 16 and 17 can supply them to the row direction charge transfer device 20 at constant pitch positions.

In this embodiment, when considering each pair of photosensors disposed in the column direction as one unit, the pitch Wv between adjacent units in the column direction is set generally equal to the pitch Wh between adjacent photosensors in the row direction. Signal charges from photosensors of first, third and fifth odd rows are read by first column direction charge transfer devices 16a to 16d disposed on the left side of each photosensor column, whereas signal charges from photosensors of second and fourth even rows are read by second column direction charge transfer devices 17a to 17d disposed on the right side of each photosensor column. In each row, the structure of all photosensors is perfectly identical and signal charges are read in the same direction. With this structure, even if a relative position of the photosensors, column direction charge transfer devices, light shielding openings and the like is displaced by variations in manufacture processes, this relative position maintains uniform. Therefore, the electric and optical characteristics of each row are always uniform.

Figure 7:
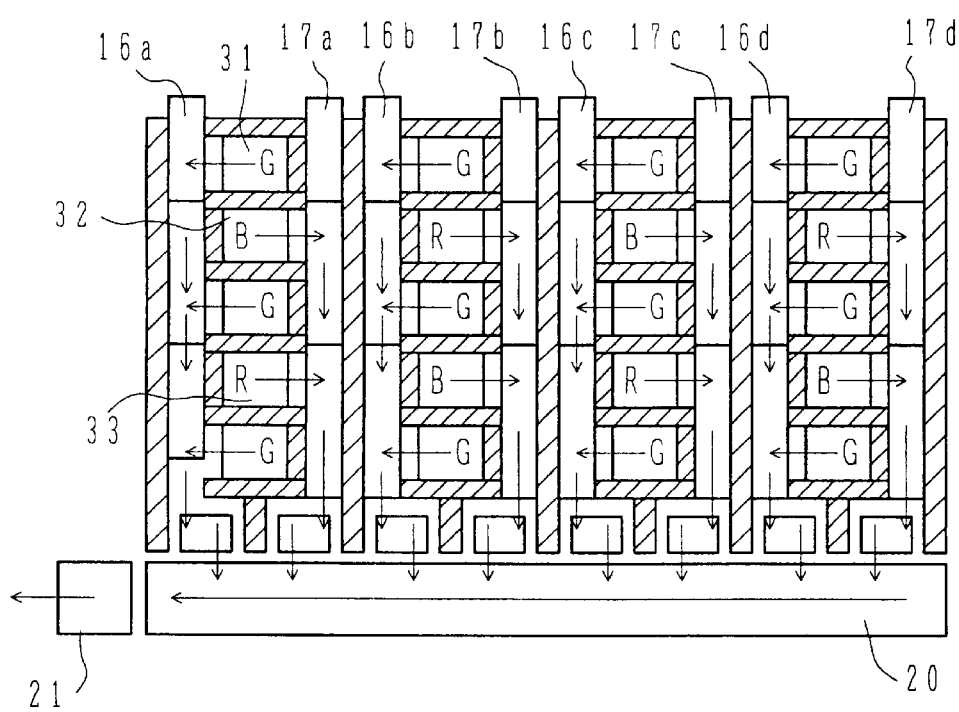
FIG. 7 shows the layout of color filters disposed on the solid state image pickup device of the fourth embodiment.

FIG. 7 shows another embodiment in which three-color filters are formed on the solid state image pickup device of the fourth embodiment shown in FIG. 6. In the embodiment shown in FIG. 7, color filters indicated at G (green), B (blue) and R (red) are formed on the light receiving area of each photosensor. In this embodiment, signal charges (G signal charges) of the photosensors with G filters are transferred by first column direction charge transfer devices 16a to 16d, and signal charges (B and R signal charges) of the photosensors with B and R filters are transferred by second column direction charge transfer devices 17a to 17d. Signal charges of the G, R and B signals are read in the same direction for each color, and the path of signal charges has the same structure for each color. Therefore, the electric characteristics of each color signal are uniform over the whole image pickup area.

Figure 8A:
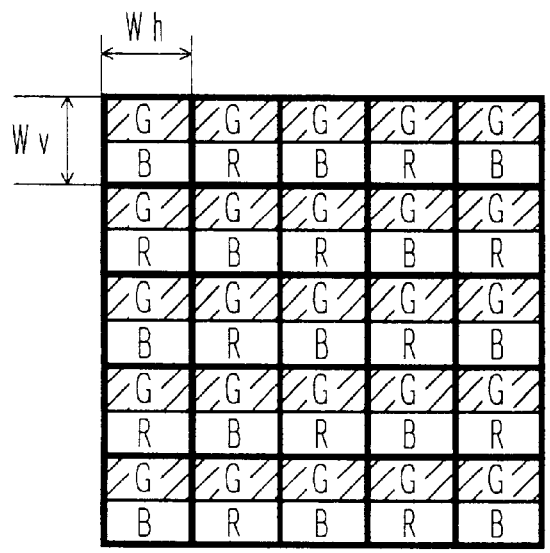
FIGS. 8A and 8B are diagrams comparing the layout of color filters of the solid state image pickup device shown in FIG. 7 with the layout of color filters of a conventional solid state image pickup device shown in FIG. 10.
Figure 8B:
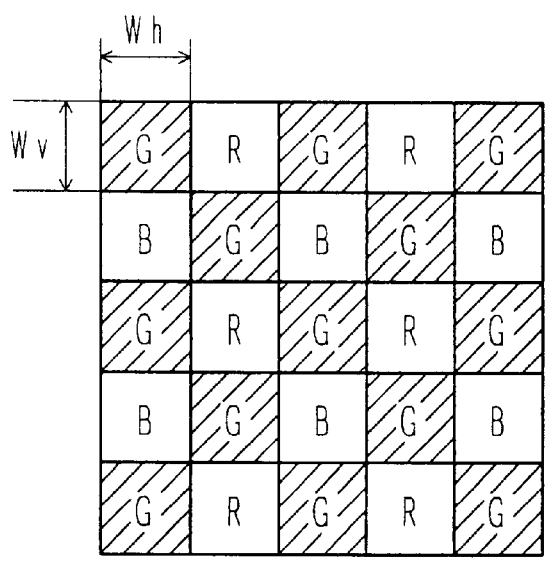

FIG. 8A shows the layout of color filters of the embodiment shown in FIG. 7, and FIG. 8B shows the layout of color filters of the conventional image pickup device shown in FIG. 10. Comparison of both the layouts will be described. An area surrounded by a bold line indicates one image sampling unit. Wh is a pitch of photosensors in the row direction, and Wv is a pitch in the column direction. It is preferable from the viewpoint of signal processing that both the pitches Wh and Wv are the same.

In general, the luminance signal which determines an image resolution is generated through weighted addition of mainly the G signal and supplementarily the R and B signals. In the embodiment, as apparent from the structure shown in FIG. 8A, the G signal (indicated by hatching) is provided at all image sampling units (Wh×Wv) represented by a square lattice (Wh×Wv). Each image sampling unit is constituted of a pair of G and R, or G and B color filters and also a pair of adjacent two upper and lower photosensors disposed in the column direction. It is therefore easy to obtain a resolution corresponding to the number of sampling units.

With the conventional techniques shown in FIG. 8B, the number of G areas (indicated by hatching) is a half of that of sampling units, and therefore the resolution is a half of this embodiment. Although the conventional structure shown in FIG. 8B can improve an apparent resolution through signal interpolation processing, inherent improvement on the resolution such as this embodiment is impossible.

The characteristics of two photosensors constituting one square sampling unit may change, however, with a shift of a relative position of the two photosensors and column direction charge transfer device. In this case, however, this relative position shift does not pose any practical problem because the color filter of one photosensor is always G and the color filter of the other photosensor is R or B according to the layout of color filters shown in FIG. 8A. Compensation for this relative position shift can be easily performed during signal processing wherein the G, R and B signals output from the image pickup device are separated into the G and R signals or the G and B signals and amplified thereafter.

Figure 9:
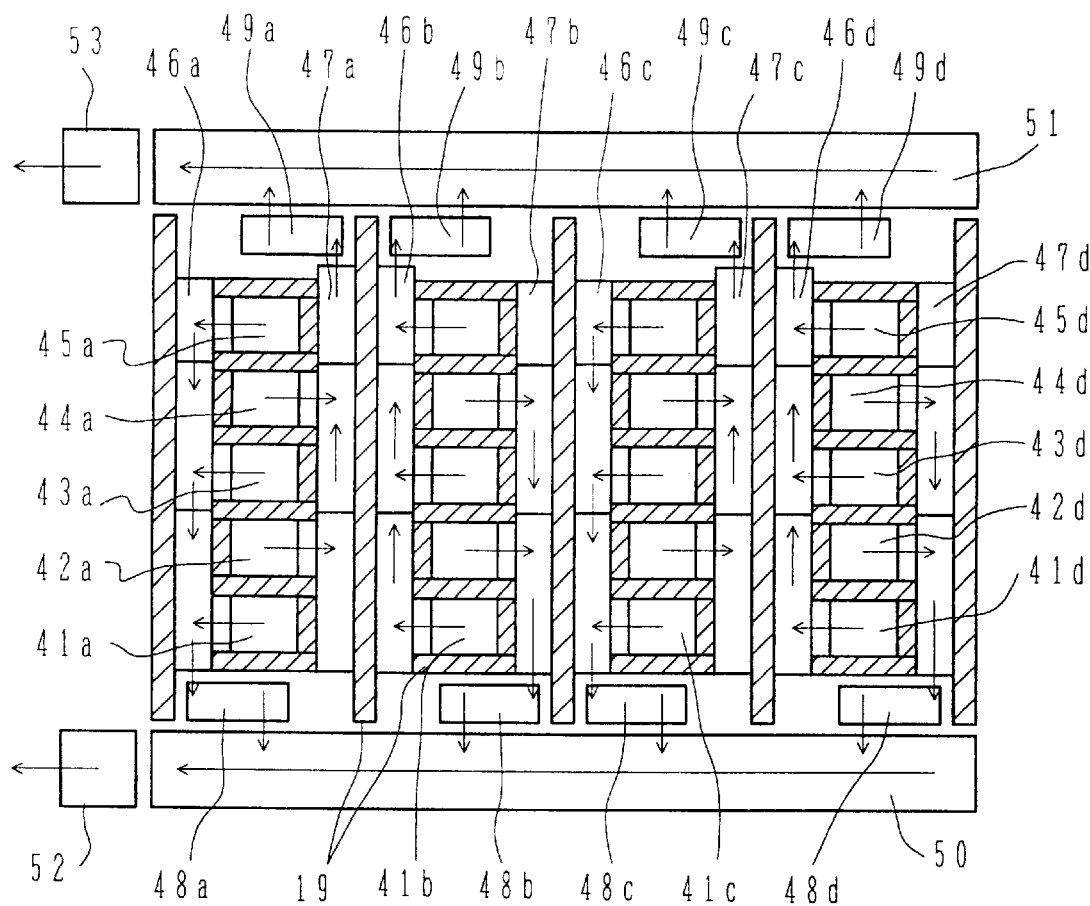
FIG. 9 is a schematic plan view showing at a larger scale a partial area of a solid image pickup device according to a fifth embodiment of the invention.

FIG. 9 is a schematic plan view showing at a larger scale a partial area of a solid image pickup device according to the fifth embodiment of the invention. A different point of this embodiment from the fourth embodiment shown in FIG. 6 is the provision of two row direction charge transfer devices and two output circuits. In FIG. 9, reference symbols 41a to 41d represent photosensors constituting a first photosensor row, reference symbols 42a to 42d represent photosensors constituting a second photosensor row, reference symbols 43a to 43d represent photosensors constituting a third photosensor row, reference symbols 44a to 44d represent photosensors constituting a fourth photosensor row, and reference symbols 45a to 45d represent photosensors constituting a fifth photosensor row. First column direction charge transfer devices 46a, 46b, 46c and 46d are disposed on the left side of respective photosensor columns, and second column direction charge transfer devices 47a, 47b, 47c and 47d are disposed on the right side of respective photosensor columns.

As seen from FIG. 9, the first column direction charge transfer devices 46a, 47b, 46c and 47d transfer signal charges downward, and the second column direction charge transfer devices 47a, 46b, 47c and 46d transfer signal charges upward. The signal charges transferred downward are transferred via the lower channel position changing units 48a to 48d to a lower row direction charge transfer device 50, and the signal charges transferred upward are transferred via the upper channel position changing units 49a to 49d to an upper row direction charge transfer device 51. The signal charges transferred by the upper and lower row direction signal charge transfer devices 51 and 50 are then output separately from upper and lower output circuits 53 and 52.

In this embodiment, since signal charges are divided into upper and lower signal charges, the number of signal charge blocks transferred by each row direction charge transfer device is halved so that the number of transfer stages of each row direction charge transfer device can be halved. With the reduction of the number of transfer stages by a half, not only integration of row direction charge transfer devices can be alleviated by a half but also the number of charge transfer times can be halved and the total transfer loss can be considerably reduced.

In this embodiment, a pair of two adjacent column direction charge transfer devices interposing the element separation layer 19 therebetween operates to transfer signal charges either upward or downward. This is because the transfer electrodes of the two adjacent column direction charge transfer devices can be easily patterned and formed traversing the element separation layer 19, and the pattern itself does not become complicated.

In the above embodiments, a solid state image pickup device of the so-called all pixel simultaneous read type that charge signals of all photosensors are read at the same time is used by way of example. The invention is not limited only to the above embodiments, but is also applicable to, for example, an interlace type solid state image pickup device of NTSC standards. In this case, there are inevitably column direction charge transfer devices or transfer stages which do not store signal charges. Such devices or transfer stages contain only noise components including smear caused by light leakage, dark current thermally generated, and other signals. If these noise components are subtracted from an image pickup signal, an output with considerably reduced noises or false signals can be obtained.

The present invention has been described in connection with the preferred embodiments. The invention is not limited only to the above embodiments. It is apparent that various modifications, improvements, combinations, and the like can be made by those skilled in the art.

What is claimed is:

1. A solid state image pickup device comprising:
a plurality of photoelectric conversion element units disposed in a row direction and a column direction, each unit including two adjacent photoelectric conversion elements disposed in the column direction, wherein a pitch of units in the row direction is generally equal to a pitch of units in the column direction; and
first and second column direction charge transfer devices disposed on both sides of each photoelectric conversion element column including a plurality of photoelectric conversion elements disposed in the column direction, said first and second column direction charge transfer devices transferring signal charges output from the photoelectric conversion elements in the column direction, wherein a ratio of the pitch of units in the row direction and the pitch of units in the column direction is approximately 1.

2. The solid state image pick up device of claim 1, wherein the units are aligned to form a rectangular array of conversion elements, each conversion element aligned with immediate adjacent conversion elements in both the row and column direction.

3. A solid state image pickup device comprising:

a plurality of photoelectric conversion element units disposed in a row direction and a column direction, each unit including two adjacent photoelectric conversion elements disposed in the column direction, wherein a pitch of units in the row direction is generally equal to a pitch of units in the column direction; and first and second column direction charge transfer devices disposed on both sides of each photoelectric conversion element column including a plurality of photoelectric conversion elements disposed in the column direction, said first and second column direction charge transfer devices transferring signal charges output from the photoelectric conversion elements in the column direction, wherein a ratio of the pitch of units in the row direction and the pitch of units in the column direction is greater than 0.8 and less than 1.2.

4. The solid state image pick up device of claim 3, wherein the units are aligned to form a rectangular array of conversion elements, each conversion element aligned with a immediate adjacent conversion elements in both the row and column direction.

5. A solid state image pickup device comprising:

a plurality of photoelectric conversion element units disposed in a row direction and a column direction, each unit including two adjacent photoelectric conversion elements disposed in the column direction, wherein a pitch of units in the row direction is generally equal to a pitch of units in the column direction, wherein the pitch of units in the column direction comprises a distance between a first corresponding point of a first one of the photoelectric conversion elements of a first unit to a first corresponding point of a first one of the photoelectric conversion elements of a second unit, first and second column direction charge transfer devices disposed on both sides of each photoelectric conversion element column including a plurality of photoelectric conversion elements disposed in the column direction, said first and second column direction charge transfer devices transferring signal charges output from the photoelectric conversion elements in the column direction, wherein a ratio of the pitch of units in the row direction and the pitch of units in the column direction is greater than 0.8 and less than 1.2.

6. The solid state image pick up device of claim 5, wherein the pitch of units in the column direction includes an entire length in the column direction of at least one intervening photoelectric conversion element between the first photoelectric conversion element of the first unit and the first photoelectric conversion element of the second unit.

7. The solid state image pick up device of claim 6, further comprising: a row direction charge transfer device coupled to said first and second column direction charge transfer devices for transferring signal charges from said first and second column direction charge transfer devices in the row direction;

a channel position changing unit for transferring signal charges from said first and second column direction charge transfer devices to said row direction charge transfer device, said channel position changing unit adjusting positions of all signal charges from said first and second column direction charge transfer devices to be generally at a constant interval on said row direction charge transfer device; and an output circuit for converting signal charges from said row direction charge transfer device into voltage signals and outputting the voltage signals.

8. The solid state image pick up device of claim 7, wherein the channel position changing unit transfers all signal charges from said first and second column direction charge transfer devices simultaneously to said row direction charge transfer device.

9. A solid state image pickup device comprising:

a plurality of photoelectric conversion element units disposed in a row direction and a column direction, each unit constituting one unit including two adjacent photoelectric conversion elements disposed in the column direction, wherein a pitch of units in the row direction is generally equal to a pitch of units in the column direction, wherein the pitch of units in the column direction comprises a distance between a first corresponding point of a first one of the photoelectric conversion elements of a first unit to a first corresponding point of a first one of the photoelectric conversion elements of a second unit, wherein a ratio of the pitch of units in the row direction and the pitch of units in the column direction is greater than 0.8 and less than 1.2.

10. The solid state image pick up device of claim 9, wherein the pitch of units in the column direction includes an entire length in the column direction of at least one intervening photoelectric conversion element between the first photoelectric conversion element of the first units and the first photoelectric conversion element of the second units.

* * * * *